(12) United States Patent
Ramaswamy

(10) Patent No.: US 9,465,444 B1
(45) Date of Patent: Oct. 11, 2016

(54) OBJECT RECOGNITION FOR GESTURE TRACKING

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 126 days.

(21) Appl. No.: 14/319,876

(22) Filed: Jun. 30, 2014

(51) Int. Cl.
*H04N 5/225* (2006.01)
*G06F 3/01* (2006.01)
*H04N 5/232* (2006.01)
*G06K 9/62* (2006.01)

(52) U.S. Cl.
CPC ............. *G06F 3/017* (2013.01); *G06K 9/6217* (2013.01); *H04N 5/23222* (2013.01)

(58) Field of Classification Search
CPC ...................... H04N 5/23232; H04N 5/23238; H04N 5/2355; H04N 5/2356; H04N 2013/0088; H04N 13/0239; G06K 9/00268; G06K 9/4642
USPC ............................. 348/169–172, 218.1, 239
See application file for complete search history.

(56) References Cited

U.S. PATENT DOCUMENTS

| | | | | |
|---|---|---|---|---|
| 2012/0242803 | A1* | 9/2012 | Tsuda | H04N 13/0022 348/46 |
| 2013/0329074 | A1* | 12/2013 | Zhang | H04N 5/2258 348/222.1 |
| 2014/0055572 | A1* | 2/2014 | Shirai | H04N 5/2258 348/47 |
| 2014/0176783 | A1* | 6/2014 | Shibagami | H04N 5/23212 348/349 |
| 2014/0267612 | A1* | 9/2014 | El Dokor | H04N 9/735 348/46 |
| 2014/0293012 | A1* | 10/2014 | Huang | H04N 13/0239 348/47 |
| 2015/0278599 | A1* | 10/2015 | Zhang | G06K 9/00604 348/78 |
| 2015/0348416 | A1* | 12/2015 | Fujita | G06K 9/00805 348/47 |

* cited by examiner

*Primary Examiner* — Kelly L Jerabek
(74) *Attorney, Agent, or Firm* — Polsinelli LLP

(57) ABSTRACT

The accuracy of object tracking using relatively low power gesture cameras can be improved by adjusting camera settings to ensure a sufficient level of contrast or texture to enable stereo disparity calculations for the representations of the object in the captured images. For general gesture input, for example, a user might use a variety of objects in various orientations, such that conventional face or object recognition processes may not be sufficient. Further, such processes are very resource intensive. By adjusting the camera settings (e.g., exposure, gain, and/or aperture) to ensure an adequate level of contrast, objects of an appropriate size and location can be tracked for purposes such as gesture input. Once such an object is identified, coordinates for a bounding box or other indicator can be transferred to any camera or sensor to be used for the tracking.

20 Claims, 6 Drawing Sheets

OBJECT RECOGNITION FOR GESTURE TRACKING

BACKGROUND

As the functionality offered by computing devices continues to improve, users are utilizing these devices in different ways for an increasing variety of purposes. For example, certain devices attempt to detect motions or locations of various objects, such as for motion or gesture input. Continually analyzing full resolution images can be very resource intensive, and can quickly drain the battery of a mobile device. Using lower resolution cameras and less robust algorithms can use fewer resources, but can result in an increase in the number of false positives and/or a decrease in the accuracy of the object tracking process. Further, such approaches are often sensitive to variations in lighting conditions.

BRIEF DESCRIPTION OF THE DRAWINGS

Various embodiments in accordance with the present disclosure will be described with reference to the drawings, in which.

DETAILED DESCRIPTION

Figure 1:
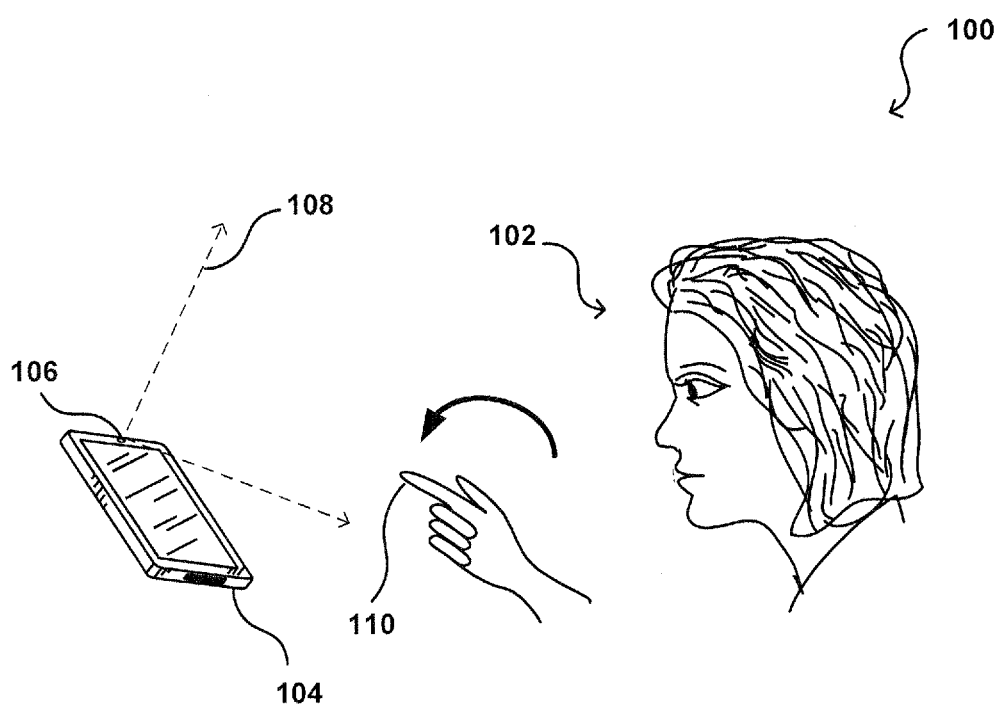
FIG. 1 illustrates an example of a user attempting to provide gesture input to a computing device in accordance with various embodiments.

Systems and methods in accordance with various embodiments of the present disclosure may overcome one or more of the aforementioned and other deficiencies experienced in conventional approaches to determining and/or tracking the position of one or more objects with respect to an electronic device. In particular, various embodiments utilize two or more gesture cameras to determine the presence and/or location of at least one object of interest, such as a fingertip, stylus, pen, or hand, among other such options. Since the device will not know ahead of time the type and/or orientation of an object to be tracked in many cases, a conventional approach such as face recognition or object identification may not be appropriate. Further, such methods are very resource intensive and may not be practical to operate continually, particularly on a portable computing device that might have limited resources. Further still, in at least some embodiments it is desirable to ensure that only motions made near the device are used for gesture input, to avoid false positives that might otherwise result from analyzing motions in the background or otherwise away from the device.

In one embodiment, image data (e.g., still image or video) with depth information is acquired to attempt to locate such an object, as well as to determine the relative size and location of that object to a computing device acquiring the image data. The image data may be low resolution data (e.g., less than about 1 MP or 2 MP) and/or may have a relatively low color depth (e.g., grayscale or 256 colors), for example, and an object location algorithm might look for objects in the image data that meet one or more object selection criteria, such as objects (e.g., areas of a relatively common intensity in an image) of a certain size, shape, and/or location. In some embodiments, the image data represents infrared (IR) light emitted by the device, reflected by the object, and detected by the device. Such an approach can be relatively low power and robust to changes in lighting conditions.

Distance information for an object represented in a captured image can be determined by capturing stereoscopic image data using the gesture cameras and analyzing the disparity for the pixels in a representation of a particular object, such as to determine that the object is within a determine distance, or a determined region near the device, and that the apparent size of the object is appropriate for that distance or region. Stereo cameras, herein referred to as "gesture" cameras, can be passive sensing systems that consume relatively low amounts of power as compared to other approaches, such as time-of-flight and structured light cameras. Disparity can be determined in at least some embodiments by analyzing the pixel locations, within the right and left images of a stereo pair, of a representation of an object to determine a difference between the pixel locations along a direction corresponding to the offset direction of the camera, which would be a horizontal direction for left and right stereo cameras. The disparity information can be determined from the difference between the pixel location, and knowing the offset between the cameras enables the distance to the object to be calculated from the disparity information. In order to determine disparity using stereo camera data, however, there must be sufficient texture (e.g., local variation in the pixel grayscale, intensity, or color values) or features in the images in order to correlate objects between the two images making up the stereoscopic image data. In order to ensure an appropriate amount of texture, for example, approaches discussed herein can capture multiple images at different camera settings, such as different exposure, gain, and/or aperture settings, and determine an amount of contrast for a located object for each setting. The amount of contrast can include, for example, the range or differences in color and/or intensity of pixels of an image that are associated with a representation of an object. Once an appropriate amount of contrast is obtained, the object can be correlated in both images and the amount of disparity determined. If the object has a size within a specified size range and is located within a determined distance or region with respect to the device, that object can be identified as an object to be tracked, such as for gesture input. If multiple such objects are detected, information for each can be determined, or one or more selection criteria can be used, such as the object closest or most centered with respect to the gesture cameras of the computing device. For a selected object, information such as a coordinate, set of pixel coordinate for an image region, or a bounding box can be determined and provided to the device, such as may be used to locate the corresponding object in image data collected by another camera on the device, such as a front-facing camera with higher resolution and color depth that can then be used to track the object with higher precision, or to one or both of the stereoscopic cameras, among other such options. Information for the exposure settings can also be passed along, which can be used to determine one or more appropriate settings for subsequent image capture as well. In some embodiments, a confidence value for the object location can be monitored, and if the confidence value falls outside a determined range, the camera setting adjustment process can be repeated. The process might also be repeated periodically in order to recalibrate or improve the accuracy of the gesture tracking and object location determination.

Various other functions and advantages are described and suggested below as may be provided in accordance with the various embodiments.

FIG. 1 illustrates an example situation 100 in which a user 102 is interacting with a computing device 104. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, smart televisions, set top boxes, a wearable computer (e.g., a smart watch or glasses), and portable media players, among others. In this example, the computing device 104 has at least one image capture element 106, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. In this example, the device 104 is analyzing image data captured by the image capture element 106 to attempt to determine whether an object, such as the fingertip 110 of the user, is present in the field of view 108 of the camera 106. If so, the device will attempt to determine the relative position of the user's fingertip to the device, and attempt to track that fingertip over time in order to attempt to determine one or more gesture inputs being provided to the computing device. As discussed, however, continually capturing and analyzing full resolution, full color images can be very resource intensive, such that it may be preferable in at least some situations to attempt to utilize a more resource-friendly approach.

Figure 2A:
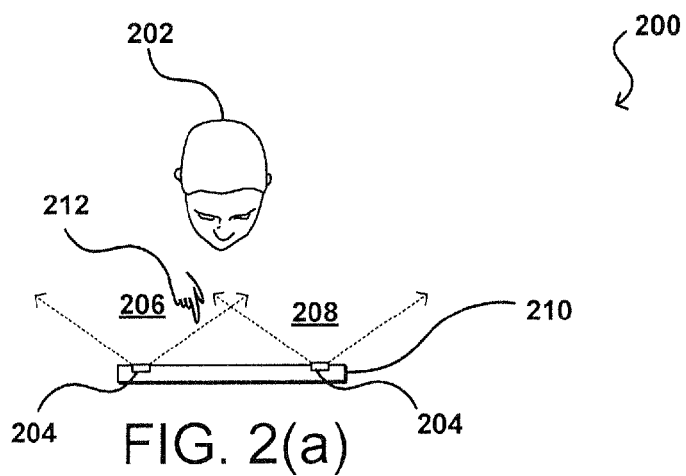
FIGS. 2(a), 2(b), 2(c), 2(d), and 2(e) illustrate approaches that can be used to attempt to determine gesture input in accordance with various embodiments.
Figure 2B:
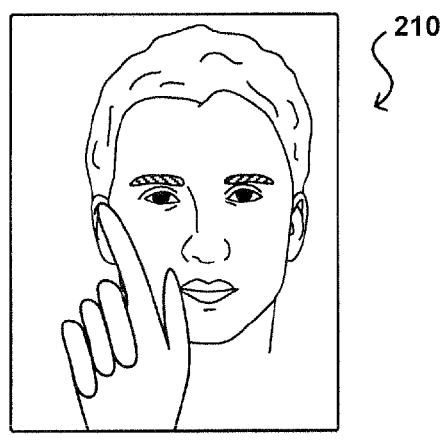
Figure 2C:
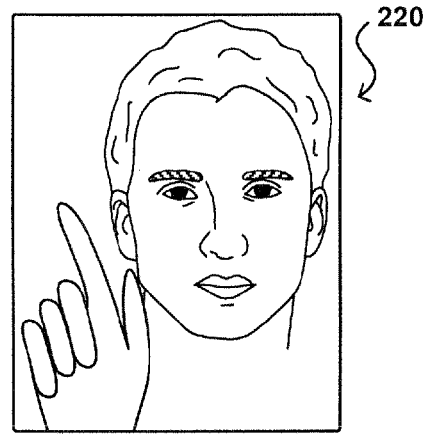

As mentioned, one approach that can be utilized does not involve a specific object recognition process, such as may involve looking for specific types of features and then matching those features to templates or classifiers for a particular type of object, but instead to look for objects of a certain size that are within a particular region or distance with respect to the device. Such an approach can be performed using a set of gesture cameras, for example, that can require less power and that can capture images that require fewer resources to store and analyze. As an example, FIG. 2(a) illustrates an example situation where a pair of gesture cameras 204 can be used to attempt to locate an object within a specific region proximate a computing device 210. For any pair of cameras that have at least a partially overlapping field of view, three-dimensional imaging can be performed by capturing image information for one or more objects from two different perspectives or points of view, and combining the information to produce a stereoscopic or "3D" image. In at least some embodiments, the fields of view can initially be matched through careful placement and calibration, such as by imaging using a known calibration standard and adjusting an optical axis of one or more cameras to have those axes be substantially parallel. The cameras thus can be matched cameras, whereby the fields of view and major axes are aligned, and where the resolution and various other parameters have similar values for each of the cameras. Three-dimensional or stereoscopic image information can be captured using two or more cameras to provide three-dimensional point data, or disparity information, which can be used to generate a depth map or otherwise determine the distance from the cameras to various features or objects. For a given camera pair, a stereoscopic image of at least one object can be generated using the respective image that was captured by each camera in the pair. Distances measurements for the at least one object then can be determined using each stereoscopic image.

FIGS. 2(a) through 2(e) illustrate example approaches for determining the relative position of an object to a computing device. In the situation 200 illustrated in FIG. 2(a), a computing device includes a pair of stereo cameras 204 that are capable of capturing stereo image data including a representation of a head 202 and/or hand 212 of a user (or other person within a field of view of the cameras). Because the cameras are offset with respect to each other, objects up to a given distance will appear to be at different locations in images captured by each camera. For example, the fingertip is in the right half of the angular field of view 206 of the left camera (in the figure) and in the left half of the angular field of view 208 of the right camera, which will result in a representation of the fingertip being at different locations in images captured by the different cameras. For example, in the image 210 illustrated in FIG. 2(b) the features of the user appear to be slightly to the right in the image with respect to the representations of corresponding features of the user in the image 220 illustrated in FIG. 2(c). The closer the features are to the cameras, the greater the offset between the representations of those features between the two images. For example, the fingertip, which is closest to the camera, may have the largest amount of offset, or disparity. The amount of disparity can be used to determine the distance from the cameras as discussed elsewhere herein. Using such an approach to determine the distance to various portions or features of the user's face enables a depth map to be generated which can determine, for each pixel in the image corresponding to the representation of the head, the distance to portion of the head represented by that pixel.

As discussed, however, in many cases it will not be known which type of object the user might use for gesture input, or which user will be providing gesture input. It also will generally be unknown what the orientation of the object will be, as the appearance of a finger in an image will be very different if upright, at an angle, or pointing toward the camera. Thus, it can be difficult to use an object template or classifier that will handle all possible objects and/or orientations that might be represented in an image. Further, the need to locate features and identify objects continually during operation can be extremely resource intensive, and can introduce latency into the tracking process.

Accordingly, approaches in accordance with various embodiments can utilize a less resource intensive approach wherein the type of object identified for tracking may not be critical, and thus does not require the use of a classifier or template, as may be used for face detection. In various embodiments, objects for tracking can be identified based primarily on aspects such as the size, shape, and/or location of an object with respect to the computing device. For example, it can be determined that objects the user might use for gesture input can be objects such as fingertips, hands, a stylus, a pen, an remote control device, and the like. These types of objects will generally have sizes over a specific range, such as from about a quarter of an inch to about six inches in one example. Thus, in at least some embodiments the process can be simplified to locating objects of that size.

In order to determine the size of the object, however, it can also be necessary to determine the distance to the object in order to know how to interpret the apparent size of the object as represented in an image. Knowing the distance to the object enables its size to be calculated based on the apparent size of the object as represented in the image and calibration information known for the camera. Distance information can also be helpful in determining which portions of the image should be considered as the same object or different objects. For example, in FIG. 2(b) the image includes a representation of different portions of a user. Without use of a classifier or template, for example, it might be difficult to determine which portion of the user should be considered as an object, particularly when certain portions of the user might be outside the range of interest for gesture input. If the device is able to determine the distance of various portions of the image, the image can be segmented into different objects based at least in part on distance, and then the appropriate portions designated as objects for tracking purposes. For example, in the images 210, 220 of FIGS. 2(b) and 2(c) the distance information could be used to quickly separate the images into at least three portions: the hand, the face, and the background. More detailed analysis can separate into more specific objects, such as the fingertip of the user.

Figure 2D:
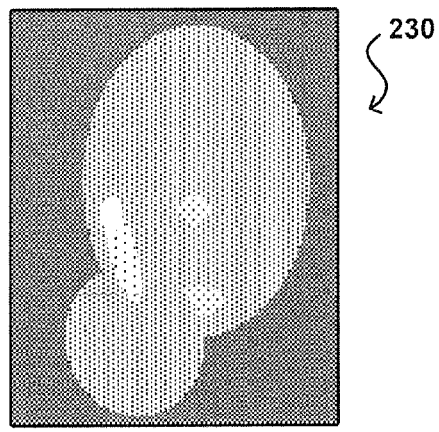
Figure 2E:
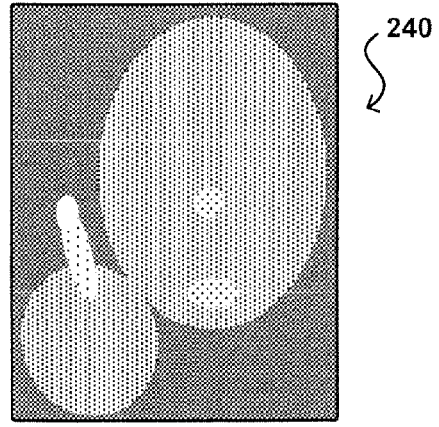

A potential difficulty to such an approach, however, is that it can be susceptible to lighting variations. In order to compute disparity information between two images, there must be sufficient features visible in the images in order to enable the device to determine which object or region in a first image corresponds to the same object or region in a second image. If there is insufficient lighting, or if the lighting is too intense, then there can be insufficient contrast to locate specific features in the images that can enable objects to be correlated between the two images. In some devices a light sensor or other such component might attempt to determine an amount of ambient light near the device, and activate an illumination source such as a white light or infrared (IR) light emitting diode (LED) in order to provide additional illumination to the scene. In many instances, however, even the illumination may be insufficient to provide the level of contrast needed to correlate objects and determine disparity. For example, FIGS. 2(d) and 2(e) illustrate example images 230, 240 where illumination, such as IR illumination, has been activated but the settings on the camera are insufficient to enable enough light to be captured to demonstrate sufficient contrast for object correlation between the two images. For example, the fingertip and the nose in the image are shown as "blobs" of relatively the same size. Since the objects will be offset in the images, it can be difficult (without more resource expensive processing) for the device to be sure which objects correspond between the two images. If the images had sufficient contrast to be able to correlate specific features of those objects, such as the edge or corner of a fingernail, then the objects could be correlated with relatively little processing.

Figure 3A:
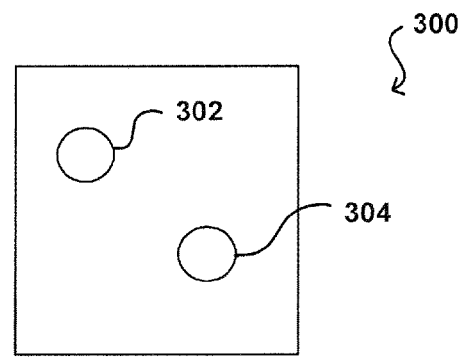
FIGS. 3(a), 3(b), and 3(c) illustrate an example approach that can be used to identify an object to be tracked for purposes of gesture input that can be used in accordance with various embodiments.
Figure 3B:
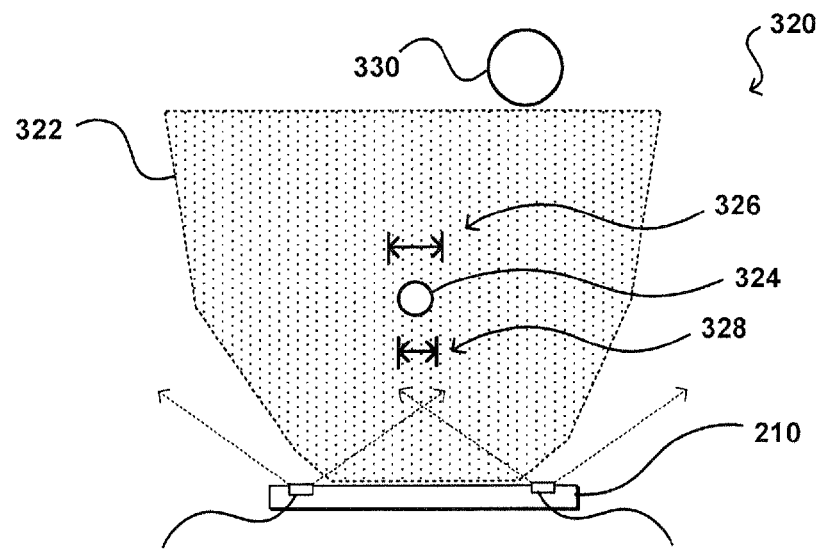
Figure 3C:
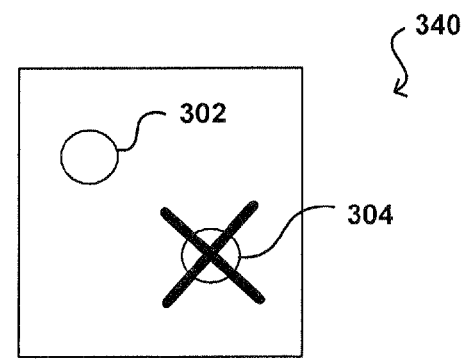

For example, FIG. 3(a) illustrates a situation 300 wherein two objects each have a representation 302, 304 in a captured image. Without attempting to identify the types of objects, it can be difficult to determine which of the objects should be used for tracking. As illustrated, simply using information such as apparent size or shape may not be sufficient, as the first representation 302 might correspond to a fingertip and the second representation 304 might correspond to a face, which due to their relative distance may appear the same size in the image even though the actual objects are quite different in size. If disparity information is able to be determined, however, then the relative distances and sizes can be determined, as illustrated in the example situation 320 of FIG. 3(b). As illustrated, there might be a specified distance or region 322 with respect to the device for which the device will look for an object to track. For a portable device, for example, this might go from the surface of the computing device to up to a standard arm's length, such as up to about three feet. There might also be an angular range specified, such as might be typical for someone looking at a display of the computing device. The region of interest 322 can be defined or selected using various other such criteria as well. As illustrated, even though the first and second representations appear to be the same size in the image 300, by analyzing the disparity it can be determined that only the fingertip 324 corresponding to the first representation 302 is in the region of interest 322. Further, it can be seen that, based on the disparity and the apparent size, that the fingertip corresponding 324 falls within the range of allowable object sizes 326, 328 for purposes. Using the disparity, it can be determined that the head 330 is both outside the region of interest 322 and larger than the largest allowable sizes 326 (e.g., diameter) for object tracking, such that the second representation 304 can be excluded, as illustrated in the situation 340 of FIG. 3(c). Information for the first representation then can be provided to the device, an application executing on the device, or another such receiver. As mentioned, in some embodiments a bounding box can be determined for the object based on the location in the stereo image data, and that bounding box transferred to a main device camera for purposes of more accurate gesture tracking.

Figure 4A:
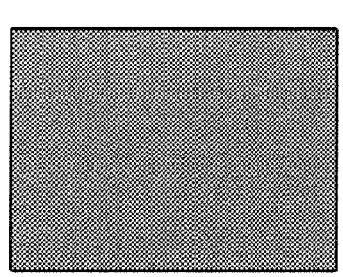
FIGS. 4(a), 4(b), 4(c), 4(d), 4(e), 4(f), and 4(g) illustrate an example approach that can be used to identify an object to be tracked for purposes of gesture input that can be used in accordance with various embodiments.
Figure 4B:
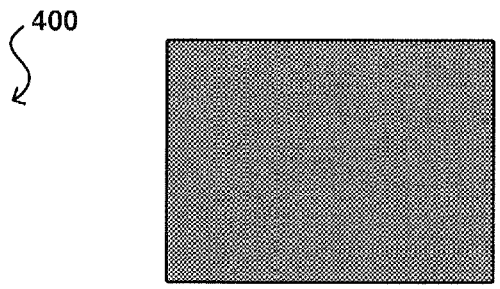
Figure 4C:
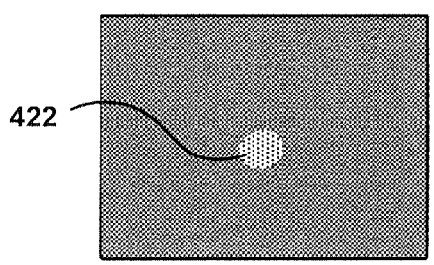
Figure 4D:
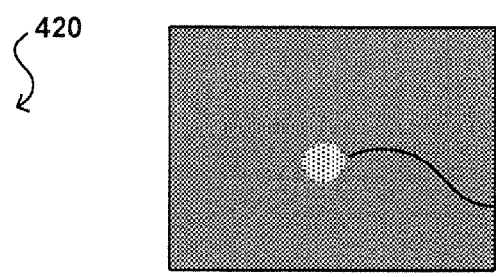

As mentioned, however, in order to determine the corresponding object representations between the images captured by each of the stereo cameras there must be enough contrast (and brightness, etc.) to enable the portions of the images corresponding to the objects to be correlated. For example, consider a first pair of images 400, 410 illustrated in FIGS. 4(a) and 4(b), which were captured by a set of stereo cameras with a first camera setting, such as a first exposure setting, although other settings such as gain and aperture can be used as well in accordance with other embodiments. As illustrated, the exposure setting was set too short, resulting in almost no contrast in either of the images 400, 410. Accordingly, the exposure setting can be adjusted, to a longer exposure time in this example, and another pair of images 420, 430 captured as illustrated in FIGS. 4(c) and 4(d). As illustrated, the contrast has improved such that a representation 422, 424 of an object is visible in each image. The contrast level may still be below a minimum contrast threshold, however, such that the representations cannot be correlated with a sufficient level of confidence, as there are few to no unique features identifiable for either representation. The contrast level also can be determined for different areas, such as across an entire image, across a region of an image including a representation of a potential object of interest, or within the bounds of the representation of the potential object of interest, among others.

Figure 4E:
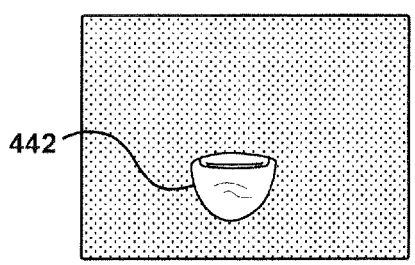
Figure 4F:
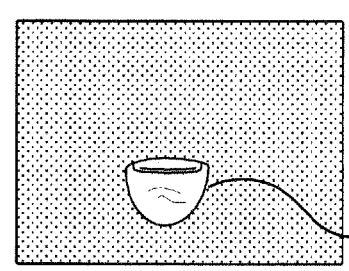
Figure 4G:
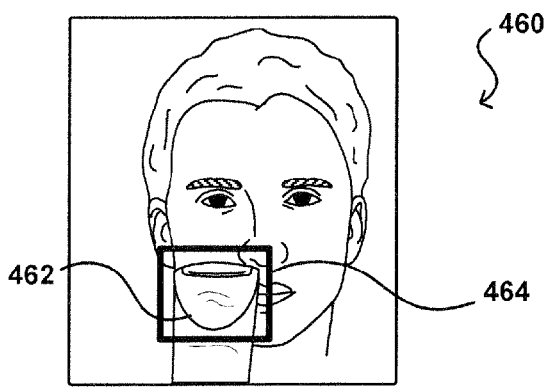

Accordingly, the exposure setting can be adjusted again and another pair of images 440, 450 captured, as illustrated in FIGS. 4(e) and 4(f). In this example, the representations 442, 452 of the object have a sufficient level of contrast such that specific features, such as fingernails and fingerprints, can be located in the images and used to correlate the representations. The process used for correlation can include any appropriate algorithm or approach known or used for generating stereoscopic images and correlating objects for purposes of determining disparity information. In at least some embodiments, a level of confidence for the correlation can be determined before accepting the determination of the object of interest. In some embodiments, various object recognition processes can be used as well. These can include, for example, appearance-based processes that search for features such as edges, changes in lighting or color, or changes in shape or size. Various other approaches utilize gradient generation and matching or histogram analysis for object recognition. Other approaches include feature-based approaches, such as may utilize interpretation trees, geometric hashing, or invariance analysis. Algorithms such as scale-invariant feature transform (SIFT) or speeded up robust features (SURF) algorithms can also be used within the scope of the various embodiments. For computer vision applications, a bag of words or similar approach can also be utilized.

A process for adjusting exposure settings, or an exposure "sweep" process, can involve two or more exposure settings, or a range of exposure settings, at which images can be captured. In at least one example, a range of settings is specified and different settings within that range are used to capture images until an object of interest is identified in the region of interest, or until the entire range is swept without finding such an object. In some embodiments, a contrast level of the region of interest might be determined, and the region is analyzed only when a specified and/or minimum amount of contrast is found in the region. Various other approaches can be utilized as well within the scope of the various embodiments. As mentioned, when an object is identified to be an object of interest, information for that object can be passed to the device, or an application executing on the device. This can include, for example, using the disparity information and knowledge about the configuration of the device to generate coordinates for a bounding box 464, as illustrated in FIG. 4(*g*), that can be used to locate the corresponding representation 462 of the feature in an image 460 captured by another camera of the computing device, or one of the stereo cameras in some embodiments. For example, in one embodiment the stereo gesture cameras can be used to track the object, in order to provide for relatively lower power object tracking. When an object is located that is close enough to the cameras (e.g., in the zone of interest) based on the determined disparity information, the exposure sweeping stops and a bounding box for representation of the object (e.g., a "blob") is determined for each of the stereo images, and the bounding box (or coordinates representing the box) can be used to track that representation or blob separately in the left and right (or other orientation) gesture cameras. Further, for subsequent frames the exposure in each camera can be optimized to enhance the contrast on each tracked representation in that camera. In some embodiments the camera settings can be continually adjusted as necessary to ensure an adequate amount of visible texture in the representation of the object in captured image data. This provides for improved accuracy of tracking and gesture detection. It can be desirable to adjust the camera exposure separately for each camera, as each camera will capture a representation of an object from a different point of view, and there might be different reflections or light positions for each camera that can affect the appropriate exposure.

A variety of tracking algorithms can be used to track the object, as discussed, as may include a median optical flow (TLD) tracker or template tracker. Joint stereo tracking may also be utilized in some embodiments. Periodically, stereo disparity may be recomputed to re-initialize the system and ensure accuracy of object location determinations. In order to ensure that the stereo disparity is robust to stereo camera misalignments, the disparity can be computed on a sub-sampled image. Alternatively, online camera calibration could be performed to ensure optimal disparity computation without loss of information that could otherwise occur during subsampling.

Figure 5:
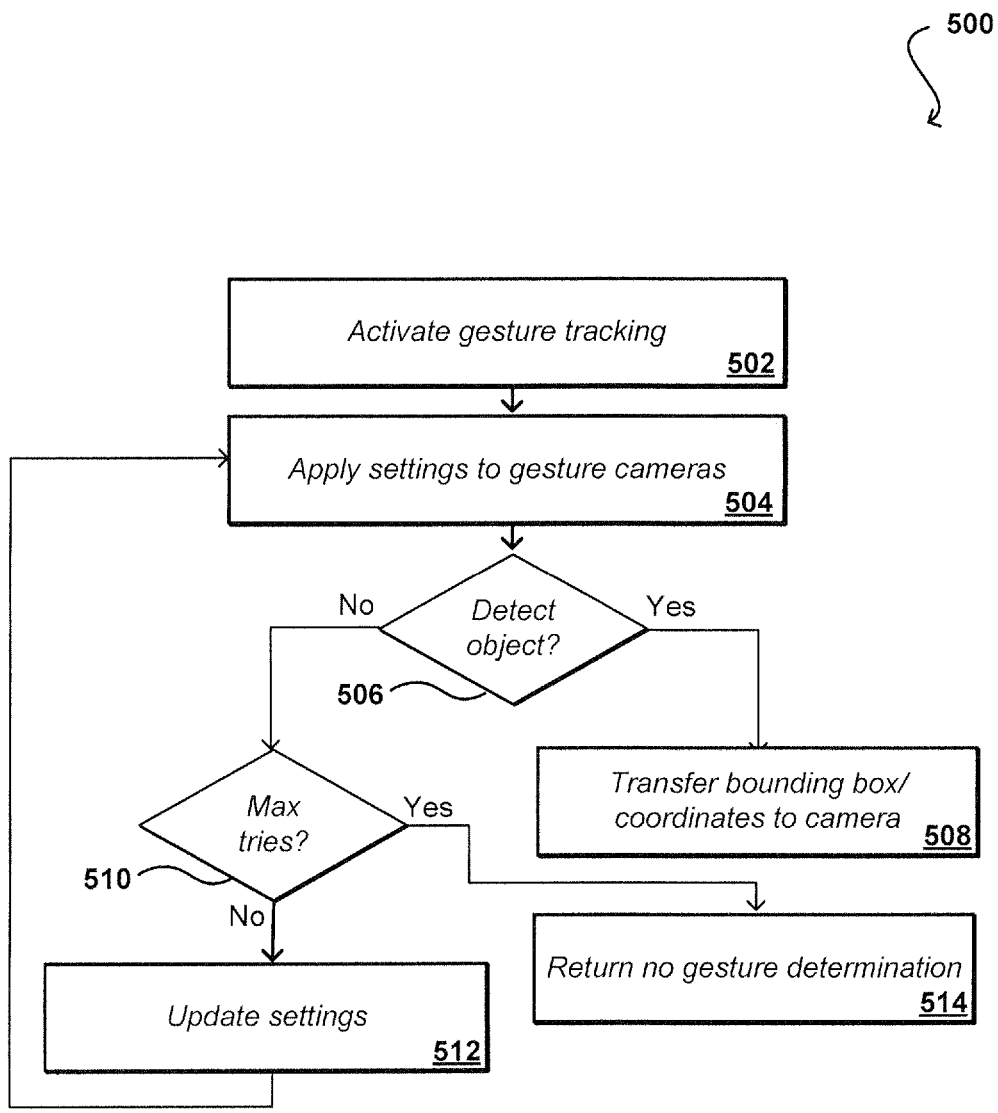
FIG. 5 illustrates an example process for determining the location of an object to track for gesture input that can be utilized in accordance with various embodiments.

FIG. 5 illustrates an example process 500 for determining an object of interest for gesture tracking that can be utilized in accordance with various embodiments. It should be understood that, for various processes discussed herein, there can be additional, fewer, or alternative steps performed in similar or alternative orders, or at least partially in parallel, in accordance with the various embodiments unless otherwise stated. In this example, gesture tracking (or another such process) is activated 502 on a computing device. The tracking can be activated at startup, manually by a user, in response to an application being accessed, or at any other such time. In order to determine whether an object of interest can be located for purposes of gesture tracking, a first camera setting (e.g., exposure, gain, and/or aperture, among others) can be applied 504 to each of a pair of gesture cameras configured for stereoscopic imaging. The same settings or different settings can be used for the cameras, although in at least some embodiments the settings should be within an allowable amount of deviation in order to reduce the likelihood of false positives or incorrect correlation due do difference in exposure, etc. A pair of images can be captured or acquired using the pair of gesture cameras, and those images analyzed to determine whether an object is detected 506 with the appropriate level of contrast. The object can also be analyzed to determine if the object is of the appropriate size and in an appropriate location with respect to the computing device. If so, a location of the representation of the object in the image captured by each of the gesture cameras can be determined and coordinates for a bounding box, as well as information for the camera settings used to locate the object, transferred 508 for use in subsequent tracking of the object. As mentioned, in some embodiments this can include sending bounding box coordinates to a tracking algorithm for use in tracking the representation of the object separately in each active gesture camera, or transferring the coordinates to a main camera for use in identifying and tracking the object, such as for purposes of gesture input over time. In at least some embodiments the tracking algorithm can determine a trajectory corresponding to a path of motion of the object over time, and compare the trajectory against a set of gesture information in order to determine gesture input to be provided to the device.

If an object of interest is not located with a sufficient level of contrast and/or confidence, a determination can be made 510 as to whether a maximum number of tries with different camera settings has been reached. If not, a new camera setting (such as a new exposure setting) can be selected 512 and another set of images captured for processing. In some embodiments, the contrast levels for at least the regions of interest in the captured images can be determined, and during an exposure sweep the process can either stop when getting to an acceptable level of contrast or can look for values that have the maximum contrast value during a full sweep of exposure settings. In some embodiments, the adjusting of the exposure or aperture setting can be performed by an image processing chip, while in other embodiments a control application can be used to adjust the settings. A benefit to adjusting the aperture setting over the exposure time is that longer exposure times can lead to motion blur in the captured images, but larger aperture sizes can result in poor depth of field in some situations. Thus, in some embodiments where both aperture and exposure settings are available, the process might adjust one or both in combinations and analyze the results. If the maximum number of attempts has been reached, such as for a full exposure value sweep, a result can be returned 514 that no object was located for purposes of gesture determination.

It at least some embodiments, a relatively high camera frame rate results in the representation of an object generally moving only up to a certain number of pixels between frames. This can help to limit the search for the object in subsequent frames. Information from a motion sensor such as a gyroscope or accelerometer can assist with determining the likely position of the representation of the object in the figures due to device motion as well. Further, the possible range of movement can be considered in the exposure sweep process, in order to attempt to optimize contrast not only in the region of interest from a previous frame, but also in the surrounding region where the object representation might be located in the current frame.

The confidence level for detection of an object also can be used as a metric for determining when to adjust the exposure for cameras used to track an object. For example, if a confidence value falls outside an acceptable range, or if the confidence value is trending toward an edge value of the range, then an attempt can be made to adjust the exposure setting to increase the confidence value. It should be understood that other camera settings, such as the camera gain or aperture setting, can also or alternatively be adjusted in other embodiments. In one embodiment, one image can be captured with a longer exposure time, and one image captured with a shorter exposure time. The detection algorithm can then be used to analyze each of those images, at least in the region of interest near the object, to determine the confidence value for each image. If one of the confidence values is higher than for the initial image, then the exposure setting can be adjusted in the corresponding direction. For example, if the image with the longer exposure setting produces a higher confidence value, then the exposure time for the camera can be increased, either by a fixed amount or the amount for the corresponding image, among other such options. In other embodiments, an exposure sweep might be triggered, as discussed elsewhere herein, to attempt to determine a relatively optimal exposure setting for current lighting conditions. The exposure setting could be adjusted until the confidence value is observed to peak, for example, and those values can then be used to determine an optimal exposure setting for current conditions. Various other approaches can be used as well.

In at least some embodiments, the exposure control can be accomplished by deactivating any auto-exposure control of the camera, which could work to adjust an overall brightness and/or contrast value for an image, which might not be sufficient or optimal for the region of interest. The exposure adjusting algorithm then can call into the exposure settings or controls of the relevant cameras(s) to adjust the exposure settings as appropriate, such as to attempt to arrive at a target contrast value for at least a region of an image. Such a closed-loop process can attempt to adjust the exposure settings in near real time, as the settings can be adjusted up or down as needed with changes in lighting conditions, as may be due to movement of the device or other such occurrences.

As mentioned, the position of an object tracked using the approaches discussed and suggested herein can be used for various purposes, such as to determine gesture input being provided by a user. In one example, a user can perform a selected motion or gesture using the user's hand or finger. The motion can be one of a set of motions or gestures recognized by the device to correspond to a particular input or action, or can be a specific motion or gesture associated with that particular user. As mentioned, the position of an object can be determined in three dimensions using the gesture camera data, and that position tracked over time. To perform an input gesture, a user might use the user's fingertip to perform a specific motion in the air. The locations of the fingertip during the motion can be determined, and compared to one or more gesture patterns stored on, or remote to, the device.

The captured image information can be analyzed to determine a period over which a detected motion might correspond to a gesture or other such input. In many embodiments, it may be too resource intensive to analyze every frame of captured video, unless the device is in a low frame rate or other such mode. In some embodiments, the device will periodically analyze captured image information to attempt to determine if a feature in the image information appears to indicate a user making a motion or gesture. In at least some embodiments, this can cause the device to begin to capture information with a higher frame rate or frequency, during which time a gesture or input analysis algorithm can be used to analyze the information. In other embodiments, the device might utilize a rolling buffer of image information, keeping image information from a recent period, such as the last ten seconds. When a possible gesture or user motion is detected, the device might also analyze the information in the buffer in case the device missed the beginning of a motion or gesture at the time of motion detection. Various other approaches can be used as well as should be apparent in light of the teachings and suggestions contained herein.

In at least some embodiments, object location data points are captured at relatively equidistant points in time. In some embodiments, such as where there is a single camera, the points might be determined in only two dimensions (x, y). If depth information is capable of being determined, such as where there are two or more image capture elements doing triangulation or stereoscopic imaging, for example, the points might instead be determined in three dimensions (x, y, z) in space. The collection of points for a given motion or gesture then can be compared against sets of points stored in a library or other such data repository, where each of those sets corresponds to a particular user, motion, gesture, or other such aspect. Using one or more point-matching algorithms, the determined collection of points can be compared against at least a portion of the stored sets until a set of points matches with a minimum level of certainty or confidence, etc. (or until there are no more sets of points to attempt to match). In some embodiments, a curve or continuous line or function can be fit to the collection of points and compared against a set of curves, for example, which can help improve the matching process in embodiments where the points are relatively far apart and the timing of those points can potentially otherwise affect the matching process.

In at least some embodiments, a device might track more than one point or feature over time. For example, a user might make a gesture that involves all five fingers, such as by going from an open hand to a particular configuration of the user's fingers. If the location of each fingertip is able to be determined from the captured image information, the relative motion of each fingertip can be tracked in position and/or time. The motion of each fingertip can form a path, which can be analyzed using an approach such as those described above with respect to a single finger.

Figure 6:
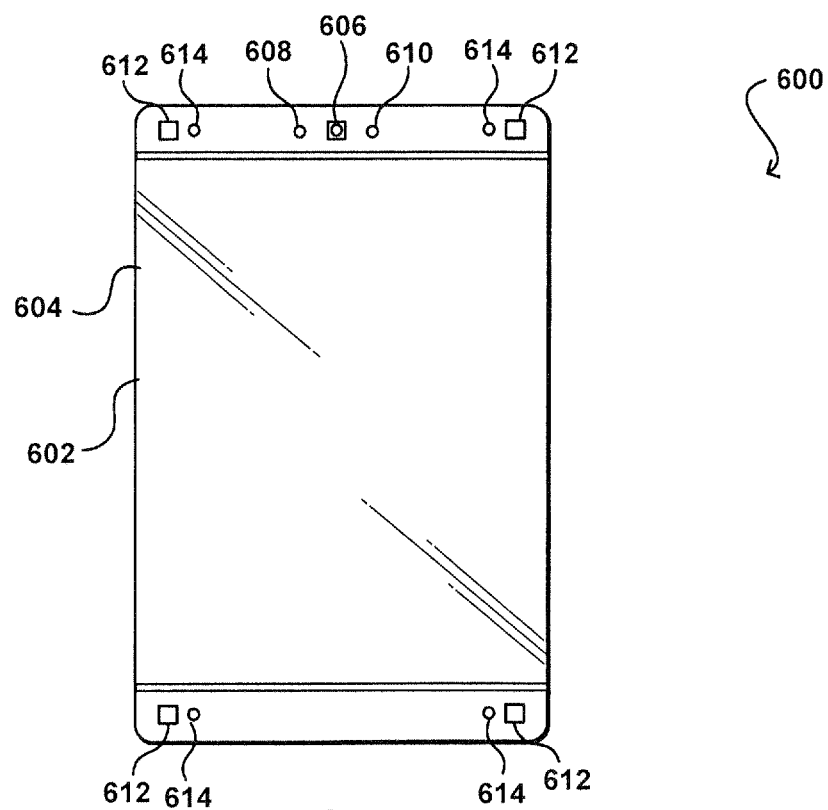
FIG. 6 illustrates an example computing device that can be utilized in accordance with various embodiments.

FIG. 6 illustrates a front view 600 of an example computing device 602 that can be used to perform methods in accordance with various embodiments discussed and suggested herein. In this example, the device has a front-facing camera 606 (i.e., a camera on the same side of the device as a display screen 604) that can be used for purposes such as video conferencing. Along with the camera, the device can also have elements such as a light sensor 608 for determining an amount of ambient light around the device, and a white light LED 610 or other such light source capable of operating as a flash, or otherwise providing light for the front-facing camera 606. The computing device also includes four camera sensors 612, which in this example can have a lower resolution, power requirement, and/or color depth than the front-facing camera 606. Such sensors can be used for purposes such as head tracking and gesture input, for example, which can require image data to be captured over a period of time but do not require full or higher resolution images. Along with each (or at least some) of these camera sensors 612 can also be a light source, such as an IR LED 614, that can emit IR that, when reflected, can be directed back toward at least the associated camera sensor 612. Placing the LEDs near the sensors can have the advantage that objects, such as human eyes, that function as retro-reflectors can enable those objects to be detected by the adjacent sensors in the captured image data. In at least some embodiments, the distance between a camera sensor and an LED can be at least 1-2 mm. It should be understood that reference numbers for similar elements can be used within a figure, or carried over between figures, for purposes of explanation and ease of understanding, but that such use should not be read as a limitation on the scope of the various embodiments unless otherwise stated.

Figure 7:
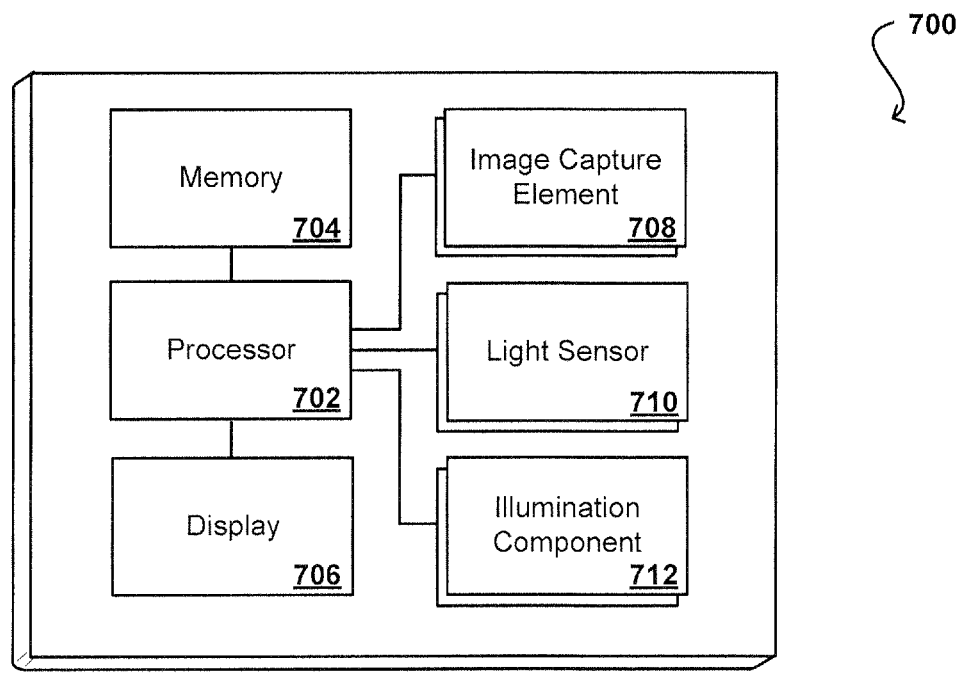
FIG. 7 illustrates an example set of basic components of a portable computing device, such as the device described with respect to FIG. 6.

In order to provide various functionality described herein, FIG. 7 illustrates an example set of basic components of a computing device 700, such as the device 602 described with respect to FIG. 6. In this example, the device includes at least one central processor 702 for executing instructions that can be stored in at least one memory device or element 704. As would be apparent to one of ordinary skill in the art, the device can include many types of memory, data storage or non-transitory computer-readable storage media, such as a first data storage for program instructions for execution by the processor 702, the same or separate storage can be used for images or data, a removable storage memory can be available for sharing information with other devices, etc. The device typically will include some type of display element 706, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least two image capture elements 708, such as two or more cameras (or at least one stereoscopic camera) that are able to image a user, people, or objects in the vicinity of the device. An image capture element can include, or be based at least in part upon any appropriate technology, such as a CCD or CMOS image capture element having a determined resolution, focal range, viewable area, and capture rate. The image capture elements can also include at least one IR sensor or detector operable to capture image information for use in determining gestures or motions of the user. The example computing device includes at least one light sensor 710 which determine the need for light when capturing an image, among other such functions. The example device 700 includes at least one illumination component 712, as may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate storage media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a first camera having a first field of view;
   a second camera having a second field of view at least partially overlapping the first field of view; and
   memory including instructions that, upon being executed by the at least one processor, cause the computing device to:
      capture a first series of images using the first camera, each image of the first series of images captured with a different exposure setting applied to the first camera;
      capture a second series of images using the second camera, each image of the second series of images captured with a different exposure setting applied to the second camera;
      determine a first image, from the first series of images, including a first region of interest around a first representation of an object in the first image, in which a first contrast level, between the first region and the first representation of the object, satisfies a threshold contrast level;
      determine a second image, from the second series of images, including a second region of interest around a second representation of the object in the second image, in which a second contrast level, between the second region and the second representation of the object, is within a specified range of contrast levels relative to the first contrast level;
      determine disparity information using the first image and the second image;
      determine that a size of the object is within a specified range of sizes based at least in part upon the disparity information;
      determine that a first distance to the object is within a specified distance based at least in part upon the disparity information;
      determine pixel coordinates of an image region corresponding to the first representation of the object in the first image; and
      locate a third representation of the object in at least one subsequently captured image based at least in part upon the pixel coordinates.

2. The computing device of claim 1, wherein the instructions upon being executed further cause the computing device to:
   determine at least a first size of the first representation of the object in the first image based at least in part upon a number of pixels included across one dimension of the first representation; and
   determine the size of the object based at least in part by calculating at least one dimension of the object at the first distance that would result in the first representation of the object having the first size in the first image.

3. The computing device of claim 1, wherein the instructions upon being executed further cause the computing device to:
   determine a first location of the first representation of the object in the first image;
   determine a second location of the second representation of the object in the second image;
   determine a difference in pixel locations of the first representation and the second representation along a direction corresponding to an offset direction of the first camera to the second camera; and calculate the disparity information based on the difference in pixel locations.

4. A computing device, comprising:

at least one processor;

a first camera having a first field of view;

a second camera having a second field of view at least partially overlapping the first field of view; and memory including instructions that, when executed by the at least one processor, cause the computing device to:

capture a first series of images using the first camera, each image of the first series of images captured with a different exposure setting applied to the first camera;

capture a second series of images using the second camera, each image of the second series of images captured with a different exposure setting applied to the second camera;

select a first image from the first series of images and a second image from the second series of images based on the first image and the second image both having a respective level of contrast within a specified range of contrast levels;

determine that a size of an object represented in the first image and the second image is within a specified range of sizes based at least in part upon disparity information determined using the first image and the second image;

determine that a distance to the object is within a specified distance based at least in part upon the disparity information;

determine pixel coordinates of an image region corresponding to a representation of the object in at least one of the first image or the second image;

provide the pixel coordinates for use in locating the object in at least one subsequently captured image;

detect a portion of a current image of the first series of images that has at least a threshold difference in intensity with respect to a surrounding portion of the current image, the portion including at least a minimum number of pixels, the portion corresponding to a potential object of interest; and determine a region of interest around the potential object of interest, wherein a current level of contrast for the current image is determined based at least in part upon a contrast determination using pixels within the region of interest of the current image.

5. A computer-implemented method, comprising:

capturing first image data using a first camera, the first image data captured using a first plurality of camera setting values, for a first camera setting, applied to the first camera;

determining a first image, from the first image data, including a first region adjacent to a first representation of an object, in which a first contrast level, between the first region and the first representation of the object, satisfies a threshold contrast level;

capturing second image data using a second camera, the second image data captured using a second plurality of camera setting values, for a second camera setting, applied to the second camera;

determining a second image, from the second image data, including a second region adjacent to a second representation of the object, in which a second contrast level, between the second region and the second representation of the object, is within a specified range of contrast levels relative to the first contrast level;

determining disparity information using the first image and the second image;

determining, based at least in part upon the disparity information, that a size and a position of the object satisfy one or more object selection criteria; and determining, based at least in part upon the size and the position of the object, location information for the object in at least one subsequently captured image.

6. The computer-implemented method of claim 5, further comprising:

capturing additional image data using a respective third plurality of camera setting values, for a plurality of camera settings, applied to the second camera; and selecting a set of camera setting values for the plurality of camera settings for capturing the second image data upon determining that the second image data corresponds to a maximum contrast level from among the first image data, the second image data, and the additional image data.

7. The computer-implemented method of claim 5, further comprising:

capturing additional image data using a respective third plurality of camera setting values, for a plurality of camera settings, applied to at least one of the first camera or the second camera, the additional image data captured at times between capture times of the first image data and the second image data, wherein the second camera setting is selected based at least in part upon the second image data having the first contrast level within the specified range of contrast levels.

8. The computer-implemented method of claim 5, further comprising:

sending pixel coordinates, corresponding to the size and the position of the object for use in identifying a representation of the object in image data captured by at least one of the first camera, the second camera, or a third camera.

9. The computer-implemented method of claim 8, further comprising:

sending information for the second camera setting for use in determining a camera setting to be used for at least one of the first camera, the second camera, or the third camera.

10. The computer-implemented method of claim 5, further comprising:

capturing third image data using a first camera setting value, for the first camera setting, applied to the first camera;

determining a third image, from the third image data, including a third region adjacent to a third representation of the object, in which a third contrast level, between the third region and the third representation of the object, satisfies the threshold contrast level;

capturing fourth image data using a second camera setting value, for the second camera setting, applied to the second camera; and applying a third camera setting value to at least one of the first camera or the second camera upon determining a fourth image, from the fourth image data, including a fourth region adjacent to a fourth representation of the object, in which a fourth contrast level, between the fourth region and the fourth representation of the object, falls outside the specified range of contrast levels.

11. The computer-implemented method of claim 5, further comprising:
causing the location information to be sent to a tracking algorithm, the location information comprising coordinates for an image region corresponding to the object;
monitoring, using the tracking algorithm, a path of motion of the object over time using the location information;
determining a trajectory of the path of motion;
comparing the trajectory to a set of gesture patterns;
determining that the trajectory corresponds to a specific gesture pattern of the set of gesture patterns; and
providing information corresponding to the specific gesture pattern to the computing device.

12. The computer-implemented method of claim 5, further comprising:
identifying a second object in the second image data, the second object having a second size and a second position that satisfy the one or more object selection criteria; and
providing second location information for the second object,
wherein gestures can be identified that are performed using more than one object.

13. The computer-implemented method of claim 5, wherein the first camera and the second camera are calibrated to ensure respective specified optical axes, the first camera configured to capture first images concurrently with the second camera capturing second images in order to obtain respective image data.

14. The computer-implemented method of claim 5, wherein the first camera setting includes at least one of an exposure time, a gain setting, or an aperture setting.

15. A computing device, comprising:
at least one processor;
a first camera;
a second camera; and
memory including instructions that, upon being executed by the at least one processor, cause the computing device to:
capture first image data using the first camera, the first image data captured using a respective first plurality of camera setting values, for a first plurality of camera settings, applied to the first camera;
determine a first image, from the first image data, including a first region adjacent to a first representation of an object, in which a first contrast level, between the first region and the first representation of the object, satisfies a threshold contrast level;
capture second image data using a second camera, the second image data captured using a respective second plurality of camera setting values, for a second plurality of camera settings, applied to the second camera;
determine a second image, from the second image data, including a second region adjacent to a second representation of the object, in which a second contrast level, between the second region and the second representation of the object, is within a specified range of contrast levels relative to the first contrast level;
determine disparity information using the first image and the second image;
determine, based at least in part upon the disparity information, that a size and a position of the object satisfy one or more object selection criteria; and
determine, based at least in part upon the size and the position of the object, location information for the object in at least one subsequently captured image.

16. The computing device of claim 15, wherein the instructions upon being executed further cause the computing device to:
select at least one first camera setting value, for at least one first camera setting, to apply to the first camera for each image of the first image data, the at least one first camera setting including at least one of an exposure setting, a camera gain setting, and an aperture setting.

17. The computing device of claim 15, wherein the instructions upon being executed further cause the computing device to:
monitor a path of motion of the object of over time using the location information;
compare the path of motion to a set of gesture patterns;
determine that the path of motion corresponds to a specific gesture pattern of the set of gesture patterns; and
send information corresponding to the specific gesture pattern as input to the computing device.

18. The computing device of claim 15, wherein the instructions upon being executed further cause the computing device to:
determine a level of confidence of a correlation between the first representation of the object in the first image data and the second representation of the object in the second image data,
wherein the object is identified upon determining that the level of confidence satisfies a minimum confidence threshold.

19. The computing device of claim 15, wherein the instructions upon being executed further cause the computing device to:
trigger an exposure sweep using at least one of the first camera or the second camera,
wherein at least one of the first image data or the second image data include images captured with different exposure settings at least until an image is determined to have a level of contrast within the specified range of contrast levels.

20. A computing device, comprising
at least one processor; and
memory including instructions that, when executed by the at least one processor, cause the computing device to:
capture a series of images using a camera assembly including a first camera and a second camera, the series of images captured using a respective series of camera settings;
analyze the series of images to identify a potential object of interest represented in the series of images;
determine that a contrast level of a portion of a specified image of the series of images is within a specified range of contrast levels;
determine, based at least in part upon the specified image, that a size and a relative position of the potential object of interest satisfy one or more object selection criteria;
locate the potential object of interest in a subsequent image of the series of images; and
determine a region of interest around the potential object of interest, wherein a second contrast level for the subsequent image is determined based at least in part upon a contrast determination using pixels within the region of interest of the subsequent image.

* * * * *